United States Patent
Nada et al.

(10) Patent No.: US 9,798,958 B2
(45) Date of Patent: Oct. 24, 2017

(54) BIOMETRIC INFORMATION REGISTRATION DEVICE AND METHOD

(71) Applicant: FUJITSU LIMITED, Kawasaki-shi, Kanagawa (JP)

(72) Inventors: Hajime Nada, Kawasaki (JP); Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/554,573

(22) Filed: Nov. 26, 2014

(65) Prior Publication Data

US 2015/0154474 A1   Jun. 4, 2015

(30) Foreign Application Priority Data

Dec. 2, 2013  (JP) ................. 2013-249637

(51) Int. Cl.
  *G06K 9/62* (2006.01)
  *G06F 21/32* (2013.01)
  *G06K 9/00* (2006.01)

(52) U.S. Cl.
  CPC ........... *G06K 9/6268* (2013.01); *G06F 21/32* (2013.01); *G06K 9/00033* (2013.01); *G06K 9/00885* (2013.01); *G06K 9/00926* (2013.01); *G06K 2009/00932* (2013.01)

(58) Field of Classification Search
  CPC .. G06F 21/32; G06K 9/6268; G06K 9/00885; G06K 9/00926; G06K 9/00355; G06K 2009/00932
  USPC ........................................... 382/115
  See application file for complete search history.

(56) References Cited

U.S. PATENT DOCUMENTS

| 2009/0309702 | A1 | 12/2009 | Hirai |
| 2012/0169464 | A1* | 7/2012 | Aoki ................. G06K 9/00926 340/5.82 |
| 2012/0230555 | A1 | 9/2012 | Miura et al. |

FOREIGN PATENT DOCUMENTS

| EP | 2477155 | 7/2012 |
| JP | 2003-141542 | 5/2003 |
| JP | 2007-048232 | 2/2007 |
| JP | 2007-94637 | 4/2007 |
| JP | 2009-258990 | 11/2009 |
| JP | 2010-27035 | 2/2010 |
| WO | 2011/061862 A1 | 5/2011 |

OTHER PUBLICATIONS

Extended European Search Report dated Apr. 17, 2015 in corresponding European Patent Application No. 14195118.6, 7 pages.

(Continued)

*Primary Examiner* — Ruiping Li
(74) *Attorney, Agent, or Firm* — Staas & Halsey LLP

(57) ABSTRACT

A biometric information registration device includes: a memory; and a processor coupled to the memory and configured to: collect a plurality of biometric information extracted from a plurality of images of a subject, classify a posture of the subject in each of the plurality of images into one of a plurality of classes, count a number of postures that corresponds to each of the plurality of classes, and store biometric information, from among the plurality of biometric information, associated with a certain class for which the number exceeds a threshold.

18 Claims, 17 Drawing Sheets

(56) References Cited

OTHER PUBLICATIONS

Goh Kah Ong Michael et al., "A contactless biometric system using multiple hand features," Journal of Visual Communication and Image Representation, vol. 23, No. 7, pp. 1068-1084, Oct. 1, 2012, 17 pages.
European Office Action dated Apr. 13, 2016 in corresponding European Patent Application No. 14 195 118.6.
European Office Action dated Jul. 28, 2017 in related European Application No. 14 195 118.6.

* cited by examiner

FIG. 11

|  | SAVED DATE AND TIME | COORDINATES P1 WITHIN IMAGE OF HAND | COORDINATES P2 WITHIN IMAGE OF HAND | ... | COORDINATES Pl WITHIN IMAGE OF HAND |
|---|---|---|---|---|---|
| POSTURE FEATURE AMOUNT n1 | 20xx 1.1. 9:00 | (Xn1_1, Yn1_1, Zn1_1) | (Xn1_2, Yn1_2, Zn1_2) | ... | (Xn1_l, Yn1_l, Zn1_l) |
| POSTURE FEATURE AMOUNT n2 | 20xx 1.2. 9:00 | (Xn2_1, Yn2_1, Zn2_1) | (Xn2_2, Yn2_2, Zn2_2) | ... | (Xn2_l, Yn2_l, Zn2_l) |
| ⋮ | | | | | |
| POSTURE FEATURE AMOUNT nm | 20xx 1.15. 9:00 | (Xnm_1, Ynm_1, Znm_1) | (Xnm_2, Ynm_2, Znm_2) | ... | (Xnm_l, Ynm_l, Zn1m_l) |

FIG. 12

|  | COORDINATES P1 WITHIN IMAGE OF HAND | COORDINATES P2 WITHIN IMAGE OF HAND | COORDINATES Pl WITHIN IMAGE OF HAND |
|---|---|---|---|
| AVERAGE VALUE Ai OF POSTURE FEATURE AMOUNTS | (XAi_1, YnAi_1, ZnAi_1) | (XAi_2, YnAi_2, ZnAi_2) | (XAi_l, YnAi_l, ZnAi_l) |

BIOMETRIC INFORMATION REGISTRATION DEVICE AND METHOD

CROSS-REFERENCE TO RELATED APPLICATION

This application is based upon and claims the benefit of priority from the prior Japanese Patent Application No. 2013-249637 filed on Dec. 2, 2013, the entire contents of which are incorporated herein by reference.

FIELD

The present disclosure is related to a technique for extracting biometric information from an image.

BACKGROUND

For example, International Publication Pamphlet No. WO 2011/061862(Patent Document 1) discloses a technique for registering information of a posture of a living body in order to register biometric information. In addition, related techniques are disclosed in Japanese Laid-open Patent Publication No. 2003-141542(Patent Document 2), Japanese Laid-open Patent Publication No. 2007-94637(Patent Document 3), Japanese Laid-open Patent Publication No. 2010-27035 (Patent Document 4), and the like.

SUMMARY

According to an aspect of the invention, a biometric information registration device includes: a memory; and a processor coupled to the memory and configured to: collect a plurality of biometric information extracted from a plurality of images of a subject, classify a posture of the subject in each of the plurality of images into one of a plurality of classes, count a number of postures that corresponds to each of the plurality of classes, and store biometric information, from among the plurality of biometric information, associated with a certain class for which the number exceeds a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating details of a posture feature amount history record of a registration data set registered in a database;

FIG. 12 is a diagram illustrating an average value of characteristic amounts of a posture;

DESCRIPTION OF EMBODIMENTS

A posture of a living body at the time of a process of registering biometric information may be different from a posture of the living body at the time of an authentication process. In this case, the accuracy of the authentication may be reduced.

According to an aspect, it is an object of techniques disclosed in embodiments to extract biometric information to be used to improve the accuracy of authentication.

Hereinafter, embodiments are described with reference to the accompanying drawings.

First Embodiment

Figure 1A:
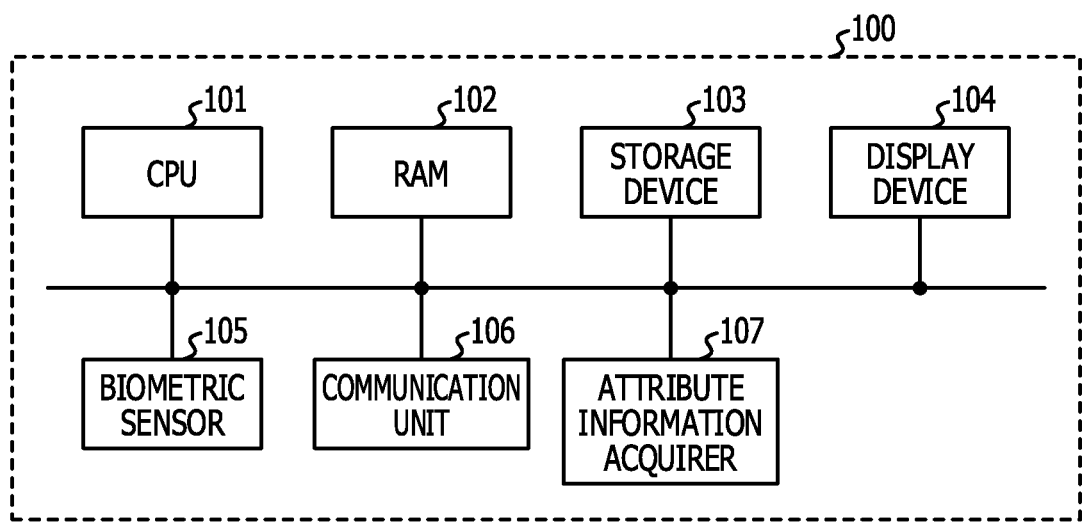
FIG. 1A is a block diagram describing a hardware configuration of a biometric information extracting device according to a first embodiment.
Figure 1B:
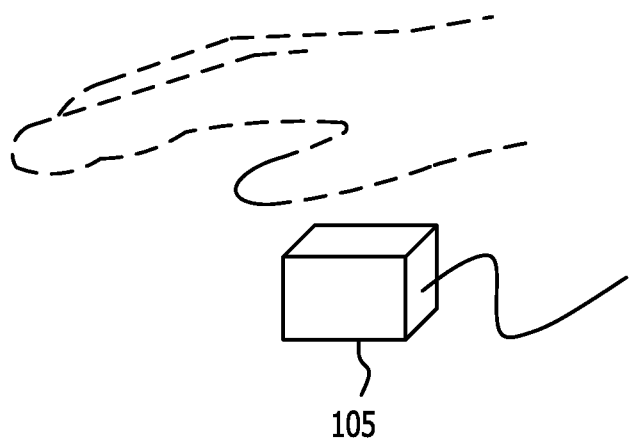
FIG. 1B is a schematic diagram of a biometric sensor.

FIG. 1A is a block diagram describing a hardware configuration of a biometric information extracting device 100 according to a first embodiment. FIG. 1B is a schematic diagram of a biometric sensor 105 described later. Referring to FIG. 1A, the biometric information extracting device 100 includes a CPU 101, a RAM 102, a storage device 103, a display device 104, the biometric sensor 105, a communication unit 106, an attribute information acquirer 107, and the like. These devices are connected by a bus and the like.

The central processing unit (CPU) 101 is a central processing unit. The CPU 101 includes one or more cores. The random access memory (RAM) 102 is a volatile memory configured to temporarily store a program to be executed by the CPU 101, data to be processed by the CPU 101, and the like.

The storage device 103 is a nonvolatile storage device. As the storage device 103, a read only memory (ROM), a solid state drive (SSD) such as a flash memory, a hard disk to be driven by a hard disk drive, or the like may be used, for example. A biometric information extraction program according to the present embodiment is stored in the storage device 103. The display device 104 is a liquid crystal display, an electroluminescence panel, or the like and is configured to display results of processes described later.

The biometric sensor 105 is a sensor that functions as a biometric information acquirer configured to acquire biometric information of a user. The biometric sensor 105 is configured to acquire an image of a palm of a hand of a user without contacting the palm in the present embodiment. Referring to FIG. 1B, the biometric sensor 105 is a complementary metal oxide semiconductor (CMOS) camera or the like as an example. The biometric sensor 105 acquires the outline of a palm of a hand or the like and uses a near infrared ray to acquire a venous pattern.

The communication unit 106 is a connection interface to a local area network (LAN) or the like. The attribute information acquirer 107 is an input device such as a keyboard or a mouse and configured to input an ID identifying a user and the like, for example.

The biometric information extraction program stored in the storage device 103 is loaded into the RAM 102 so as to be executable. The CPU 101 executes the biometric information extraction program loaded in the RAM 102. Thus, the processes are executed by the biometric information extracting device 100. By the execution of the biometric information extraction program, a registration process, an authentication process, a classification process, and the like are executed.

The registration process is a process of registering biometric information acquired by the biometric sensor 105 in a database. In the present embodiment, a venous pattern extracted from an image of a palm of a hand and characteristic amounts of a posture of the palm are registered in the database. The authentication process is a process of determining that an interested user is the same person as a registered user if a similarity between crosschecking biometric information acquired by the biometric sensor 105 and registration biometric information registered in the database is equal to or larger than a fourth predetermined threshold. In the present embodiment, it is determined that the interested user is the same person as the registered user if a similarity between a venous pattern acquired in the authentication process and the venous pattern registered in the database is equal to or larger than the fourth predetermined threshold. In addition, if the authentication succeeds, the characteristic amounts of the posture that are acquired in the authentication process are associated with the user and registered in the database. The classification process is a process of classifying, into one or more classes, the plurality of characteristic amounts of the posture that have been associated with a user and registered. Details of the processes are described later.

Figure 2:
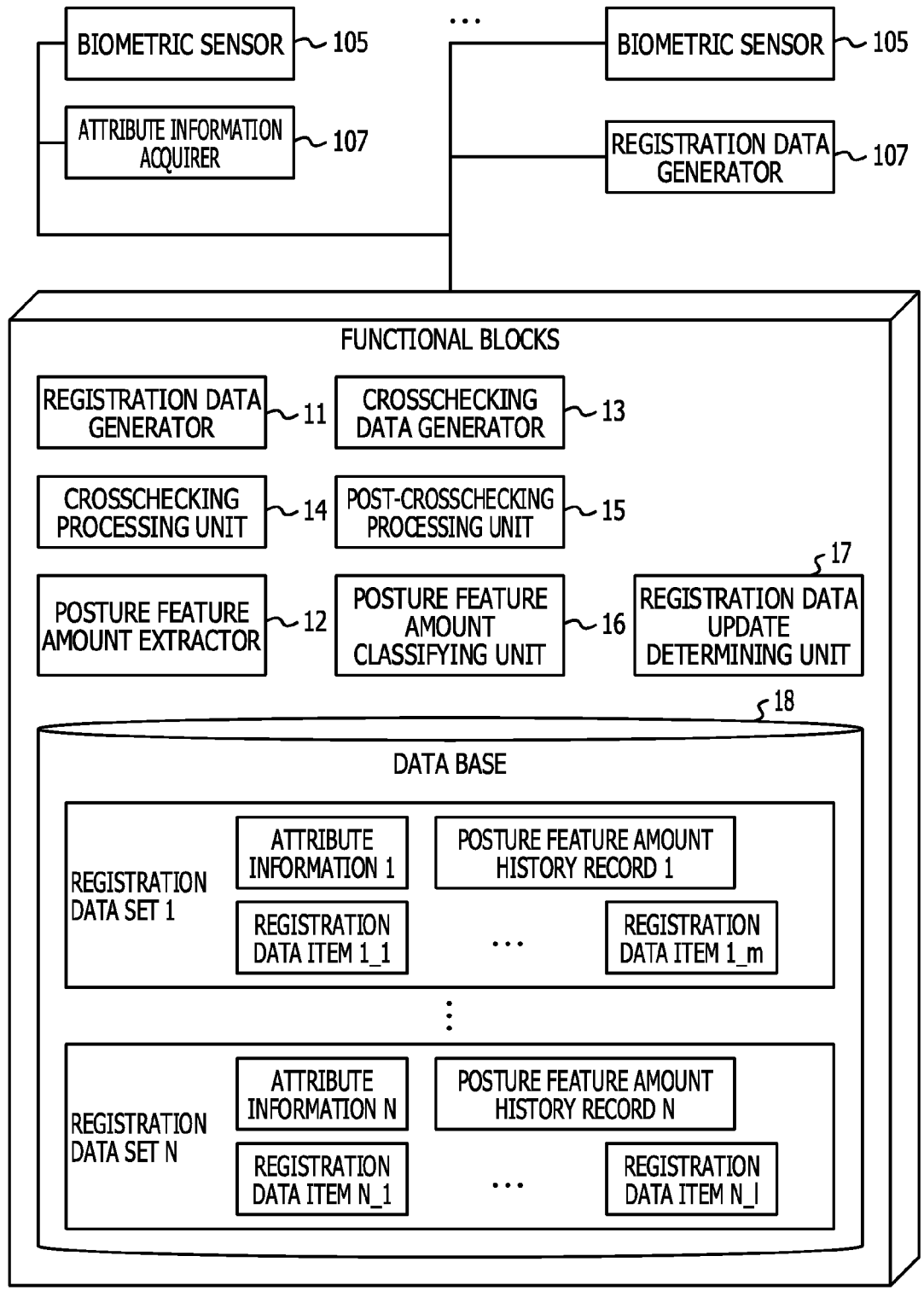
FIG. 2 is a block diagram of functions that are achieved by the execution of a biometric information extraction program.

FIG. 2 is a block diagram of functions that are achieved by the execution of the biometric information extraction program. By the execution of the biometric information extraction program, a registration data generator 11, a posture feature amount extractor 12, a crosschecking data generator 13, a crosschecking processing unit 14, a post-crosschecking processing unit 15, a posture feature amount classifying unit 16, a registration data update determining unit 17, a database 18, and the like are achieved.

A plurality of registration data items are associated with each user and registered in the database 18. For example, as exemplified in FIG. 2, attribution information 1 and registration data items 1_1 to 1_m (m≥1) are registered in a registration data set 1 for a user 1. Characteristic amounts of a posture of a hand of the user 1 when authentication of the user 1 succeeds are stored in a posture feature amount history record 1. After the classification process described later, the posture feature amounts classified into classes, and the registration data items associated with the posture feature amounts, are registered in the posture feature amount history record 1.

A plurality of pairs of biometric sensors 105 and attribute information acquirers 107 may be provided. Alternatively, a desired pair may be selected from the plurality of pairs based on a usage situation and attached.

Figure 3A:
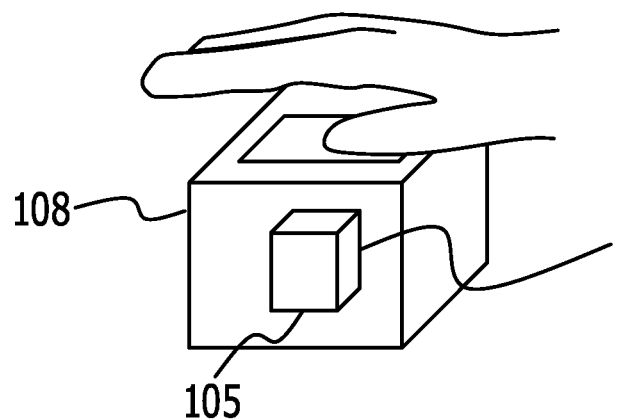
FIGS. 3A, 3B, and 3C are diagrams illustrating an example of the biometric sensor.
Figure 3B:
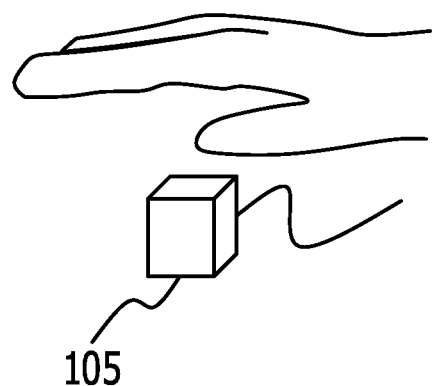

FIGS. 3A and 3B are diagrams illustrating an example of the biometric sensor 105. As exemplified in FIG. 3A, a guide 108 on which a palm of a hand is to be placed may be provided for the biometric sensor 105. By providing the guide 108, a posture of the palm is easily fixed. This suppresses a variation in the posture of the palm at the time of the registration process or authentication process. As exemplified in FIG. 3B, however, the guide is not provided for the authentication process in some cases.

For example, there is a case where if the guide is replaced with a device that uses a biometric sensor that does not support the guide, the guide is not used for the subsequent authentication. In addition, there is also a case where the guide is used as an aid in inputting because of a lack of experience of the inputting for registration and is not used for the authentication from a certain time because of repetitive execution of the authentication and proficiency in the inputting. Alternatively, there is also a case where while a common guide provided for registration is prepared, a guide is not prepared for each user and used for the authentication.

Figure 3C:
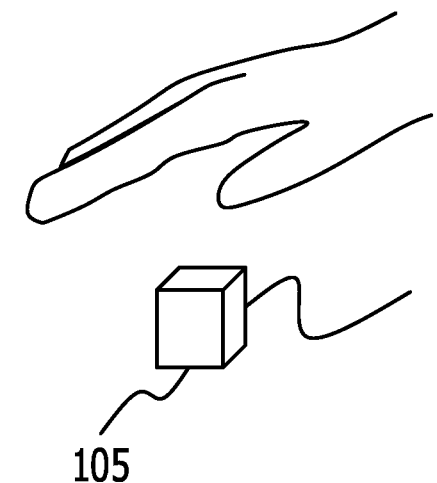

In this case, as exemplified in FIG. 3C, the posture of the palm may vary. Thus, a posture of the palm at the time of the registration process may be different from a posture of the palm at the time of the authentication process and the accuracy of the authentication may be reduced.

In addition, if a device to be used for the registration process is different from a device to be used for the authentication process, or methods for using the device are different, or a positional relationship between the user and the device at the time of the registration process is different from a positional relationship between the user and the device at the time of the authentication process, or the like, an angle and position of a biometric information acquiring device used at the time of the registration process are different from an angle and position of the biometric information acquiring device used at the time of the authentication process, and thus a posture at the time of the authentication process is significantly different from a posture at the time of the registration process in some cases.

An example in which the devices to be used are different is that in a system that is logged in using biometric authentication, registration is executed using the biometric information acquiring device connected to a stationary desktop PC within a corporate office and authentication is executed using the biometric information acquiring device installed in a tablet PC permitted to be taken out of a corporate office.

In addition, an example in which the methods for using the device are different is that in a system in which the tablet PC is unlocked using biometric authentication, registration is executed with the tablet PC placed on a desk and authentication is executed with the tablet PC held.

As a case where the positional relationship between the user and the device at the time of the registration process is different from the positional relationship between the user and the device at the time of the authentication process, there is an example in which, in a system in which the biometric sensor that is installed in a laptop PC, mouse, or keyboard that is movable on a desk or the like is used, a positional relationship between the user and the biometric sensor at the time of the registration process is different from a positional relationship between the user and the biometric sensor at the time of the authentication process due to a movement of the biometric sensor.

It is, therefore, effective to prepare registration data items for postures at the time of inputting of biometric information and use the data items in a crosschecking process. For example, in Patent Document 2, a plurality of facial patterns and additional codes that represent information of states at the time of inputting are registered (additionally registered) as registration data items in face authentication, and the plurality of registration data items are used for the authentication. If authentication using a password registered in advance succeeds, a facial pattern and an additional code that are input for the authentication may be additionally registered. In this technique, registration data items are prepared for additional codes and used for the authentication. This technique inhibits an increase in a time for the authentication and an increase in a rate of rejecting a person.

In the technique disclosed in Patent Document 2, however, a user classifies postures at the time of inputting of biometric information, and thus registration data items corresponding to a posture when the user unconsciously executes the inputting may not be registered. In addition, when an additional code is specified and the inputting is executed, a posture corresponding to the additional code may not be reproduced and additional registration is executed a plurality of times in some cases. An operation for the registration to be executed the plurality of times take great time and effort for an administrator and user of the system, and it takes a long time to complete the operation.

In addition, in Patent Documents 3 and 4, registration data items are classified in face authentication based on information that is a requirement for a facial orientation of a human subject, a requirement for illumination, a facial expression, and the like at the time of inputting. If a registration data item of a class associated with information at the time of authentication is unregistered, the registration data item is generated from input biometric information and additionally registered. Registration data items are prepared for classes and used for authentication and thereby inhibit an increase in a time for the authentication and an increase in a rate of rejecting a person.

In the techniques disclosed in Patent Documents 3 and 4, however, a requirement for a facial orientation and a facial expression that are requirements for classification into classes are determined in advance and used for the classification. On the other hand, if biometric information of palms of hands is input, there are differences between postures of the palms of persons. In addition, if the type of a device to be used, a method for the utilization, or a positional relationship between a user and the device is changed, a posture of a palm easily changes. For these reasons, if fixed classification is executed, a posture of a palm may not be acquired.

In the techniques disclosed in the aforementioned Patent Documents 2 to 4, once a registration data item associated with a class is registered, a registration data item associated with the class may not be added and updated. Even if a registration data item that is more suitable as a representative of a class than an initially registered registration data item is generated, the generated registration data item may not be updated and the accuracy of the authentication may not be improved.

On the other hand, if authentication data that is used for the authentication and is a venous pattern or the like is stored in a database, the number of storage regions is increased and a cost increases. In addition, a security risk caused by leakage of authentication data increases. For example, if details of the authentication data are analyzed by a hill climb attack, the larger the amount of the authentication data, the more the detailed analysis is successful and the higher the possibility that the authentication data is fraudulently used. For these reasons, it is preferable that registration data items to be stored be minimal. Furthermore, if the same device is used and methods for the utilization are different, a posture may significantly vary and it is difficult to execute the classification using only an ID of the device.

The biometric information extracting device 100 according to the present embodiment extracts biometric information that enables the accuracy of authentication to be improved. Hereinafter, details of processing executed by the biometric information extracting device 100, specifically, the registration process, crosschecking process, classification process, and crosschecking process after the classification are described.

(Registration Process)

Figure 4:
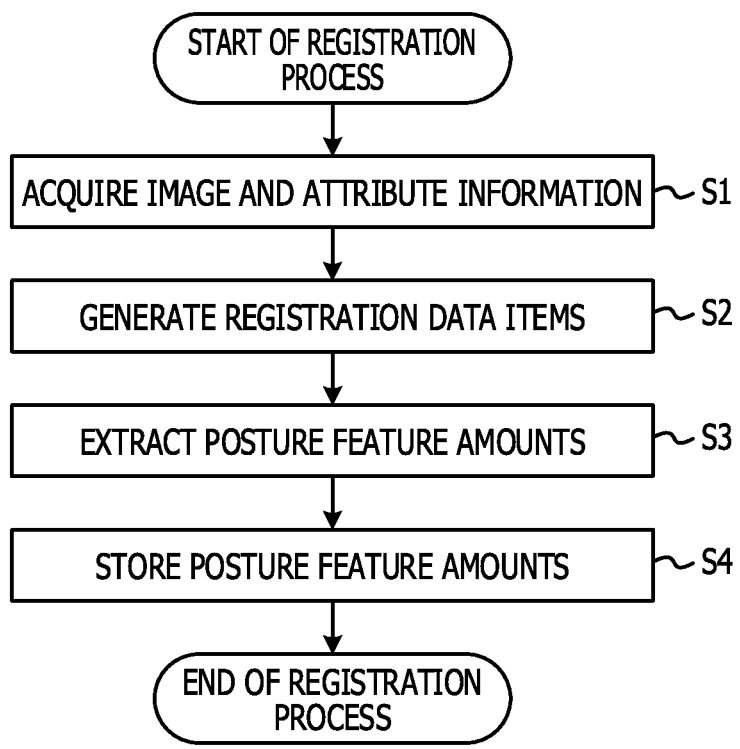
FIG. 4 is a flowchart of an example of a registration process.

FIG. 4 is a flowchart of an example of the registration process. As exemplified in FIG. 4, first, the biometric sensor 105 acquires an image of a palm of a hand of a user, and the attribute information acquirer 107 acquires attribute information of the user (in step S1). Next, the registration data generator 11 generates registration data items (registration biometric information) from the image of the palm (in step S2). In the present embodiment, the registration data items are the venous pattern.

Figure 5A:
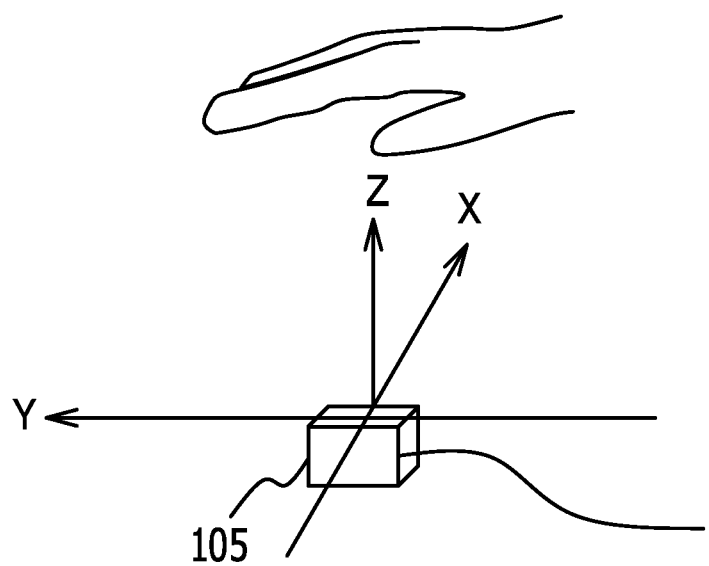
FIGS. 5A and 5B are diagrams illustrating a coordinate system with its origin at the center of the biometric sensor.
Figure 5B:
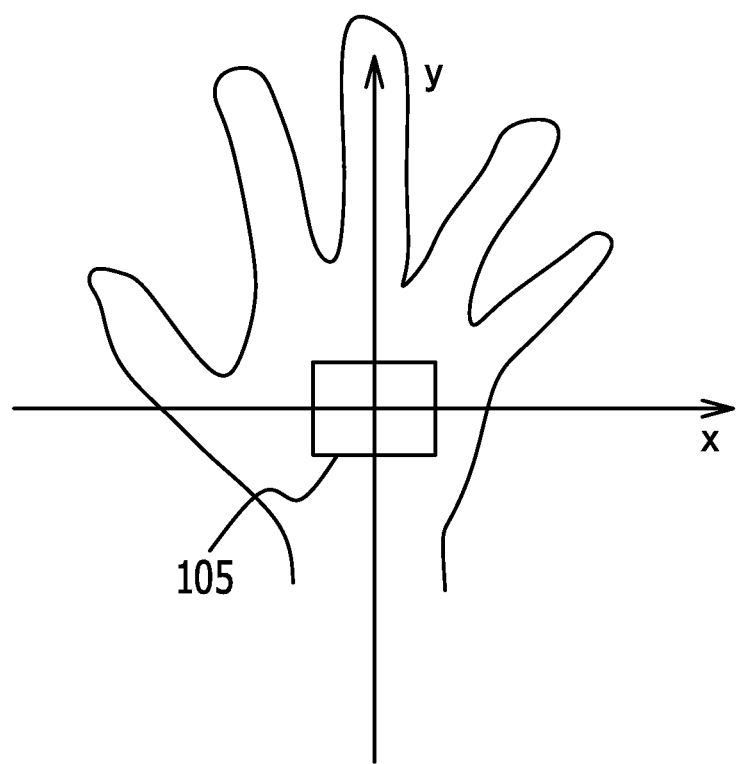
Figure 6:
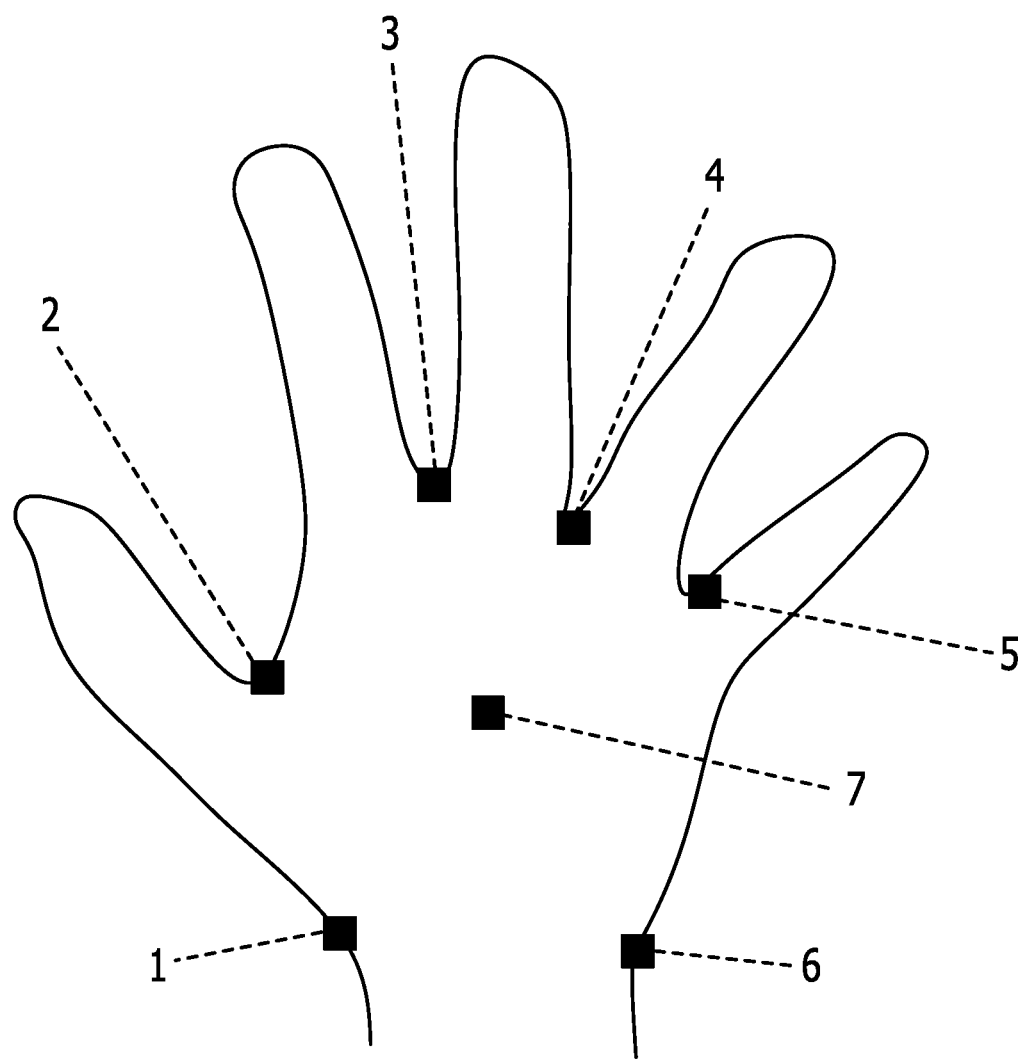
FIG. 6 is a diagram illustrating characteristic points of a hand.

Next, the posture feature amount extractor 12 extracts posture feature amounts from the image acquired in step S1 and representing the palm (in step S3). The posture feature amounts are amounts that characterize a posture of the living body. In the present embodiment, as the posture feature amounts, coordinate values of characteristic points of the palm in a coordinate system with its origin at the center of the biometric sensor 105 or the like may be used, as illustrated in FIGS. 5A and 5B. FIG. 5A is a side view of the biometric sensor 105 and the palm, while FIG. 5B is a top view of the biometric sensor 105 and the palm. As the characteristic points of the palm, a point 1 of the base of the thumb at the wrist, points 2 to 5 between the fingers, a point 6 of the base of the little finger at the wrist, a central point 7 of the palm, and the like may be used as illustrated in FIG. 6. The central point 7 is the center of gravity of the points 1 to 6 as an example. The posture feature amount extractor 12 associates the extracted posture feature amounts with attribution information and a venous pattern and registers the posture feature amounts in the database 18 (in step S4). By the aforementioned processes, the registration process is terminated.

(Authentication Process)

Figure 7:
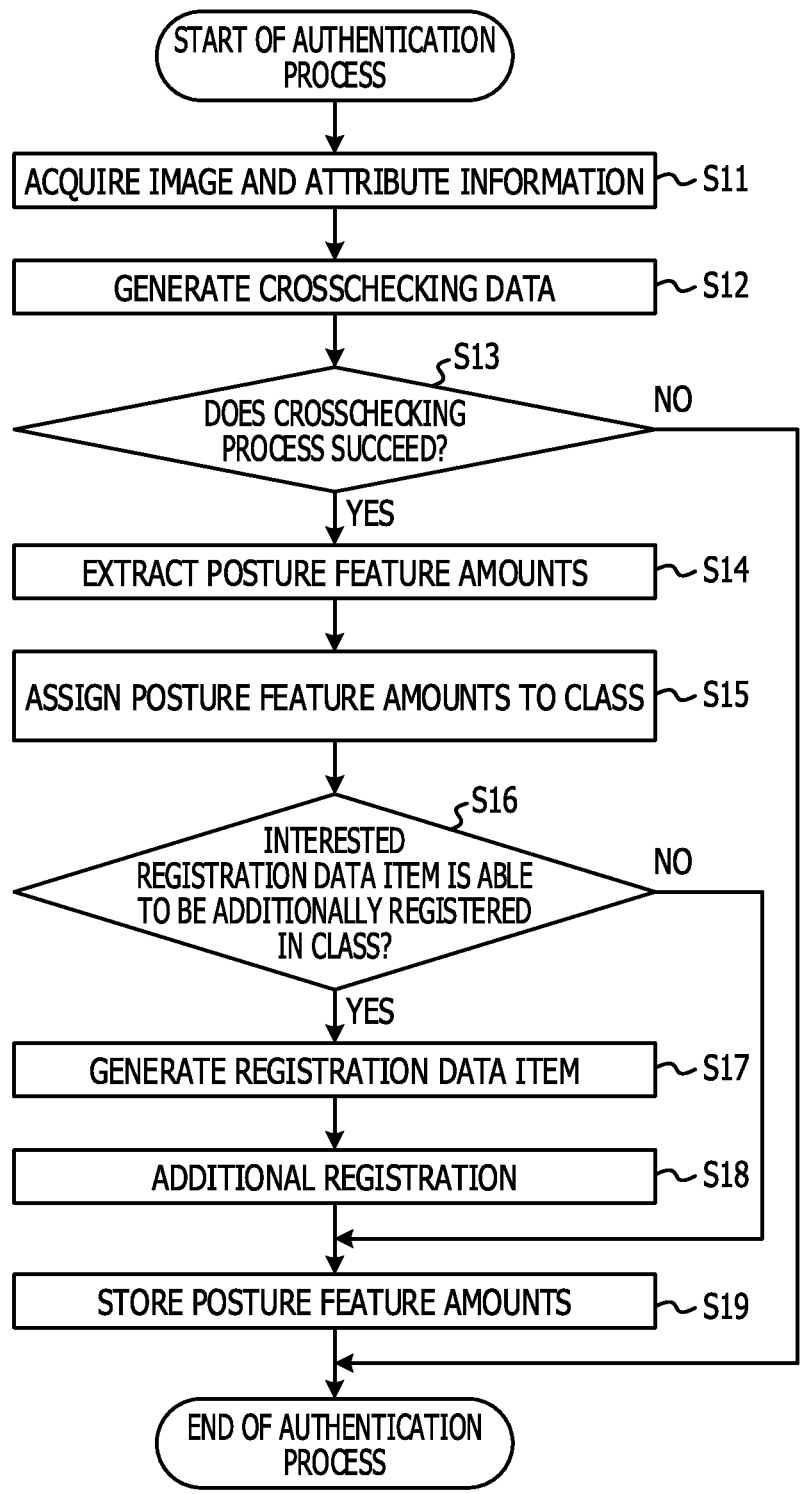
FIG. 7 is a flowchart of an example of a crosschecking process.

FIG. 7 is a flowchart of an example of the authentication process. As exemplified in FIG. 7, the biometric sensor 105 acquires an image of a palm of a hand of a user and the attribute information acquirer 107 acquires attribute information of the user (in step S11). Next, the crosschecking data generator 13 generates crosschecking data (biometric information for crosschecking) from the image acquired in step S11 and representing the palm (in step S12). In the present embodiment, the crosschecking data is a venous pattern.

Figure 8:
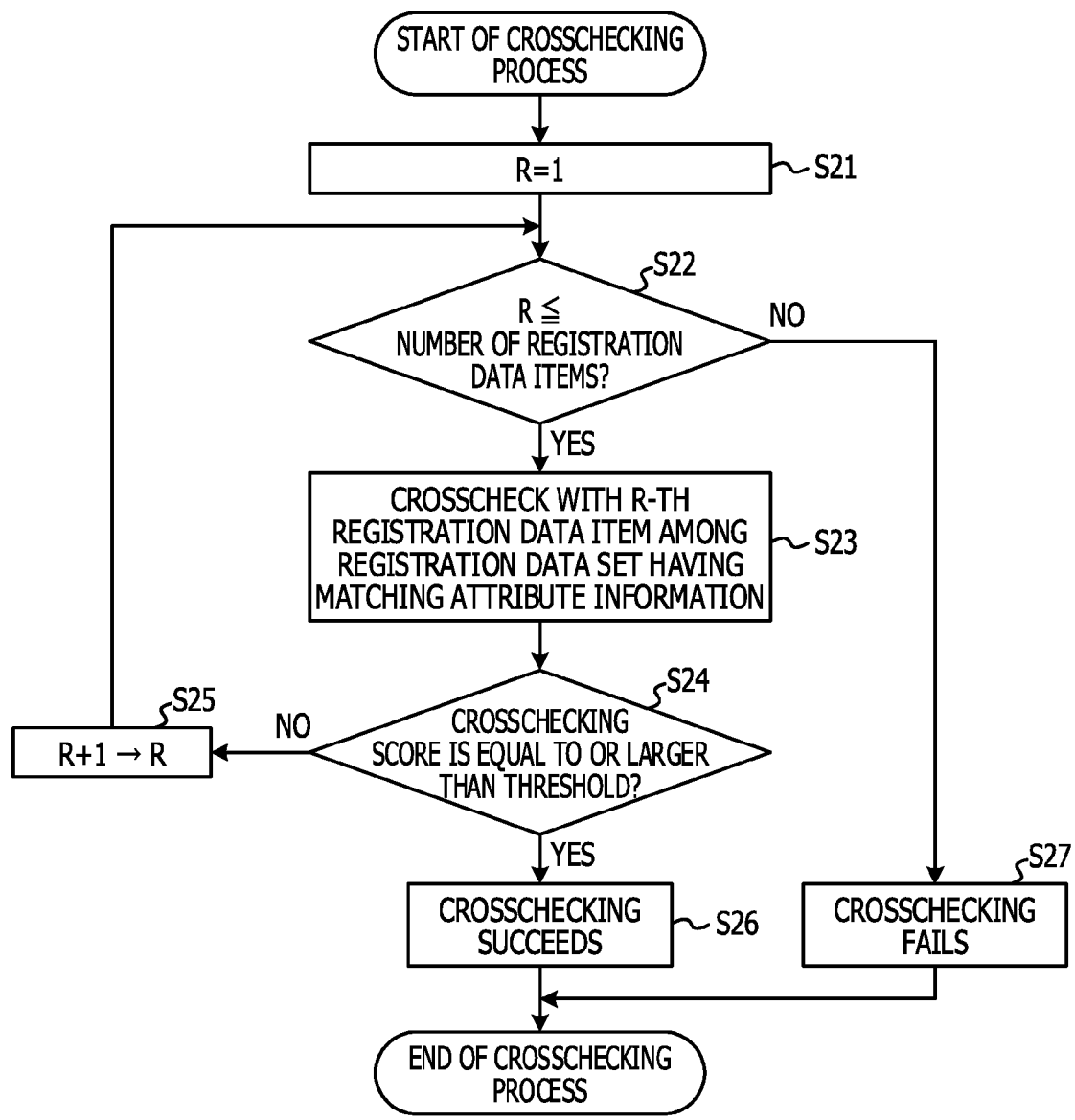
FIG. 8 is an example of a flowchart of details of crosschecking executed in step S13.

Next, the crosschecking processing unit 14 crosschecks the crosschecking data with registration data items (in step S13). FIG. 8 illustrates an example of a flowchart of details of the crosschecking executed in step S13. As exemplified in FIG. 8, the crosschecking processing unit 14 assigns 1 to a variable R (in step S21). Next, the crosschecking processing unit 14 determines whether or not the variable R is equal to or smaller than the number of registration data items associated with attribute information that matches the attribute information acquired in step S11 (in step S22). If the crosschecking processing unit 14 determines that the answer to step S22 is "Yes", the crosschecking processing unit 14 crosschecks the crosschecking data with an R-th registration data item that is represented by the variable R and is among the registration data items associated with the attribute information that matches the attribute information acquired in step S11 (in step S23).

Next, the crosschecking processing unit 14 determines whether or not a score (similarity) of the crosschecking of the R-th registration data with the crosschecking data is equal to or larger than the fourth predetermined threshold (in step S24). If the crosschecking processing unit 14 determines that the answer to step S24 is "No", the crosschecking processing unit 14 assigns R+1 to the variable R (in step S25). After that, the process is executed from step S22. If the crosschecking processing unit 14 determines that the answer to step S24 is "Yes", the crosschecking processing unit 14 determines that the crosschecking succeeds (in step S26). Then, the execution of the process represented by the flowchart is terminated. If the crosschecking processing unit 14 determines that the answer to step S22 is "No", the crosschecking processing unit 14 determines that the crosschecking fails (in step S27). Then, the execution of the process represented by the flowchart is terminated.

Returning to FIG. 7, the crosschecking processing unit 14 determines whether or not the crosschecking succeeds (in step S13). If the crosschecking processing unit 14 determines that the answer to step S13 is "Yes", the posture feature amount extractor 12 extracts posture feature amounts from the image acquired in step S11 and representing the palm (in step S14).

Next, the registration data update determining unit 17 determines a class into which the posture feature amounts extracted in step S14 are classified and assigns the posture feature amounts to the interested class (in step S15). The classification of the posture feature amounts is described later. Next, the registration data update determining unit 17 determines whether or not a registration data item has been registered in the interested class (in step S16). Specifically, the registration data update determining unit 17 determines whether or not a registration data item is able to be additionally registered.

Figure 9:
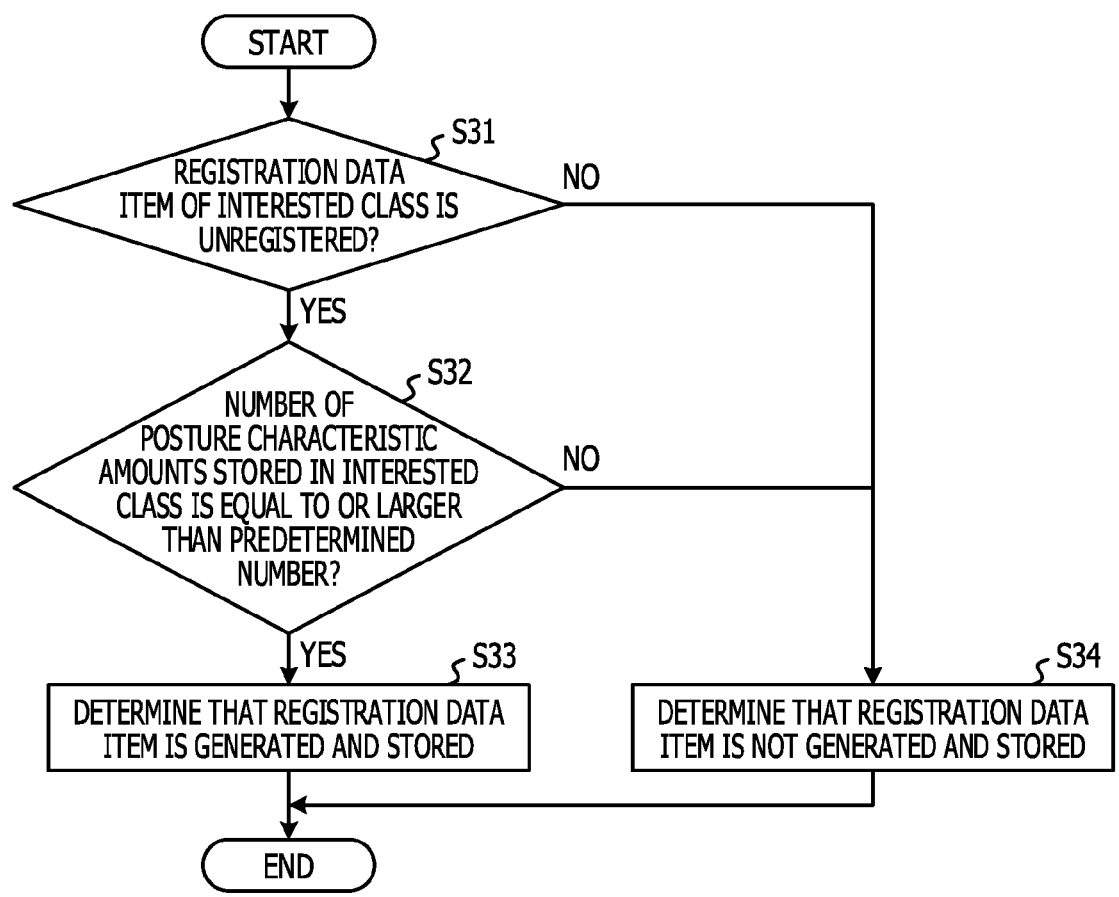
FIG. 9 is an example of a flowchart of determination of additional registration.

FIG. 9 illustrates an example of a flowchart of the determination of whether or not the registration data item is additionally registered. As exemplified in FIG. 9, the registration data update determining unit 17 determines whether or not a registration data item of the interested class is unregistered (in step S31). If the registration data update determining unit 17 determines that the answer to step S31 is "Yes", the registration data update determining unit 17 determines whether or not the number of posture feature amounts stored in the interested class is equal to or larger than a first predetermined number (in step S32). If the registration data update determining unit 17 determines that the answer to step S32 is "Yes", the registration data update determining unit 17 determines that the registration data item is generated and stored (in step S33). If the registration data update determining unit 17 determines that the answer to step S31 or step S32 is "No", the registration data update determining unit 17 determines that the registration data item is not generated and stored (in step S34).

If a registration data item associated with a class corresponding to posture feature amounts is not registered and the number of the registered posture feature amounts corresponding to the interested class is equal to or larger than the first predetermined number, it is determined that additional registration is possible. The fact that the number of the registered posture feature amounts is equal to or larger than the first predetermined number indicates that the frequency of inputting from a posture corresponding to the interested class is high. By adding the limit on the additional registration based on this requirement, a registration data item that corresponds to a posture from which the inputting is executed at a high frequency may be well selected and additionally registered, a processing time may be reduced, and the accuracy of the authentication may be improved.

If the registration data update determining unit 17 determines that the answer to step S16 is "No", the crosschecking processing unit 15 registers the posture feature amounts extracted in step S14 in a posture feature amount history record of the database 18 (in step S19). If the registration data update determining unit 17 determines that the answer to step S16 is "Yes", the registration data generator 11 generates a registration data item from the crosschecking data generated in step S12 (in step S17). Next, the registration data generator 11 associates the registration data item generated in step S17 with the class to which the posture feature amounts are assigned in step S15 and additionally registers the registration data item in the database 18 (in step S18). Next, step S19 is executed.

Every time crosschecking succeeds, posture feature amounts are registered in a posture feature amount history record by the execution of the authentication process. If a registration data item is able to be additionally registered in each of classes, crosschecking data is additionally registered as a registration data item. Thus, a registration data item is registered in each of the classes.

(Classification Process)

Figure 10:
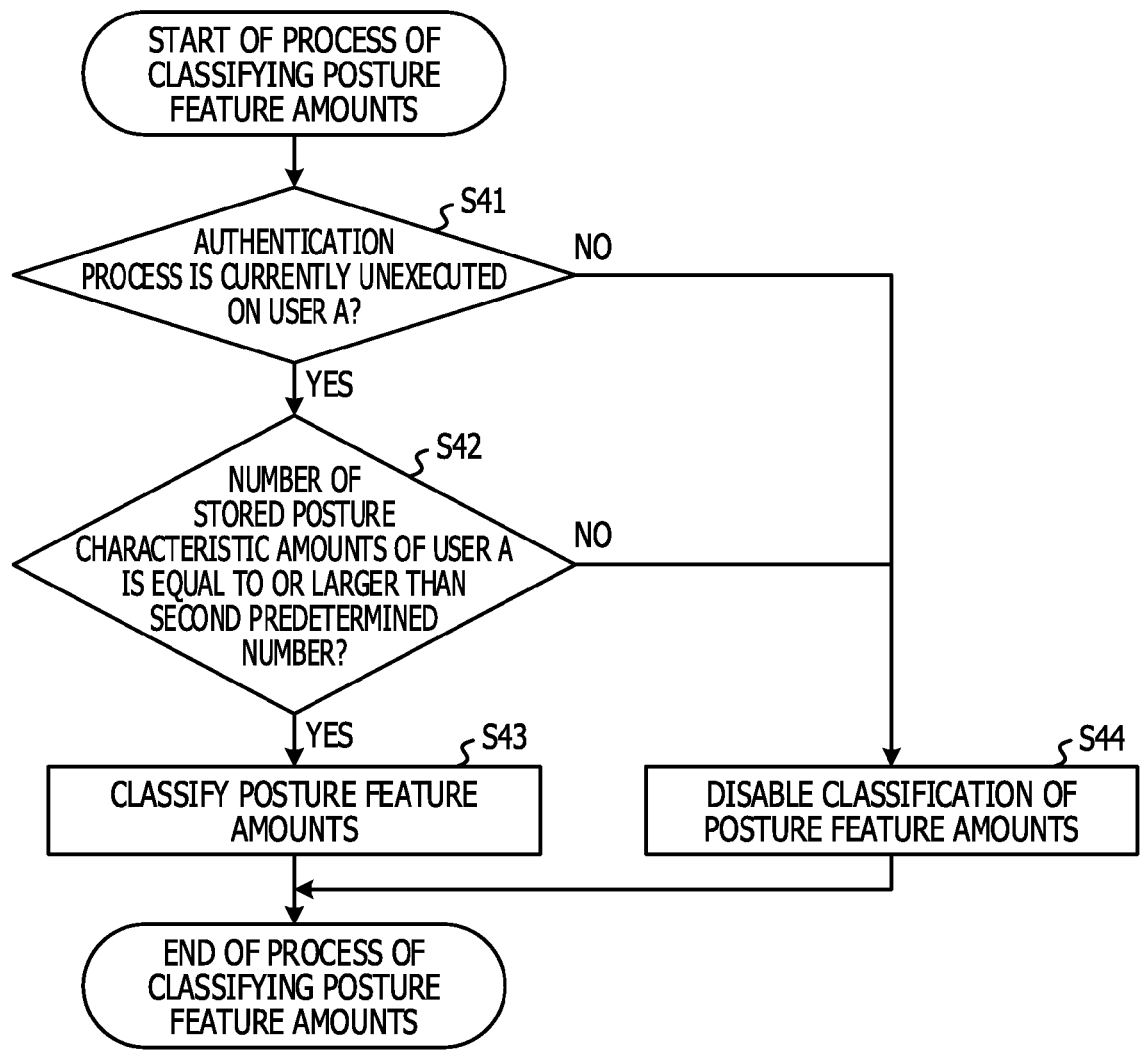
FIG. 10 is a flowchart of an example of a process of classifying characteristic amounts of a posture into a plurality of classes.

FIG. 10 is a flowchart of an example of the process of classifying posture feature amounts into a plurality of classes. This process represented by the flowchart may be executed immediately after authentication of a predetermined user (user A) succeeds. Alternatively, the process represented by the flowchart may be executed in a time zone in which the possibility that the user A performs the authentication process is low. The posture feature amount classifying unit 16 determines whether or not the authentication process is currently unexecuted on the user A (in step S41).

If the posture feature amount classifying unit 16 determines that the answer to step S41 is "Yes", the posture feature amount classifying unit 16 determines whether or not the number of posture feature amounts associated with the interested user and registered is equal to or larger than a second predetermined number (in step S42). In this case, if the number of the posture feature amounts initially registered for confirmation in the process represented by the flowchart is equal to or larger than the second predetermined number, the answer is determined to be "Yes". If the posture feature amount classifying unit 16 determines that the answer to step S42 is "No", the posture feature amount classifying unit 16 may determine that the number of the posture feature amounts is insufficient and is not suitable for the classification, and the registered posture feature amounts may be classified into a single class as initial values for the classification. In this case, it is assumed that registration biometric information associated with the interested single class is biometric information registered in the registration. If the posture feature amount classifying unit 16 determines that the answer to step S42 is "Yes", the posture feature amount classifying unit 16 classifies the posture feature amounts (in step S43). After that, the execution of the process represented by the flowchart is terminated. If the posture feature amount classifying unit 16 determines that the answer to step S41 or S42 is "No", the posture feature amount classifying unit 16 does not classify the posture feature amounts (in step S44). After that, the execution of the process represented by the flowchart is terminated.

It is desirable that the second predetermined number used in step S42 be equal to or larger than an upper limit of the number of classes estimated after the classification. The upper limit of the number of classes is described later.

After the classification of the posture feature amounts, the posture feature amount classifying unit 16 associates stored registration data items with classes to which posture feature amounts of the registration data items belong. In this case, a plurality of registration data items associated with a certain class may be stored. In this case, a single registration data item associated with the interested class may be selected from among the plurality of registration data items. For example, if the posture feature amount classifying unit 16 uses a classification method for determining a representative point of posture feature amounts belonging to each of classes, a registration data item associated with a posture feature amount that is closest to the representative point among posture feature amounts belonging to the class may be determined as a registration data item associated with the interested class. In addition, a stored registration data item other than registration data items associated with the classes may be deleted. Furthermore, a stored posture feature amount other than posture feature amounts associated with registration data items associated with the classes may be deleted.

Alternatively, the posture feature amount classifying unit 16 may store history records of the numbers of failures of the authentication and history records of the numbers of successes of the authentication, and if the number of the stored history records is equal to or larger than a fifth predetermined number and a probability that the authentication fails is lower than a third predetermined value, the posture feature amount classifying unit 16 may execute the classification and associate stored registration data items with the classes again. Alternatively, if a frequency at which a distance between a posture feature amount stored after the classification and a representative point of a class to which the posture feature amount belongs is equal to or larger than a sixth predetermined value exceeds a seventh predetermined number, the posture feature amount classifying unit 16 may execute the classification and associate stored registration data items with the classes again.

By the reclassification, a new class in which a posture that is not covered by conventional classification is reflected may be generated. Thus, a rate of rejecting a person may be reduced.

As methods for the classification, hierarchical clustering and non-hierarchical clustering may be used.

As the hierarchical clustering, a nearest neighbor method or Ward's method may be used. If the hierarchical clustering is used, the posture feature amount classifying unit 16 starts the classification from an initial state in which each of registered posture feature amounts is treated as a respective class. The posture feature amount classifying unit 16 uses a distance function defined for each classification method to combine classes with each other. The posture feature amount classifying unit 16 sets a distance threshold in advance. If the number of the classes becomes equal to or smaller than the upper limit of the number of classes and a distance between classes to be combined is larger than the distance threshold, the posture feature amount classifying unit 16 terminates the classification. In the classification using the hierarchical clustering, the more significantly the posture at the time of the inputting varies, the larger the number of steps up to the classification of posture feature amounts into the same class. Thus, the more significantly the posture at the time of the inputting varies, the more easily posture feature amounts are classified into different classes, and the posture feature amounts may be classified into classes corresponding to a larger number of types of postures.

In addition, as the non-hierarchical clustering, a k-means method or a fuzzy c-means method may be used, for example. An example in which data items are classified into a number k of classes by the k-means method is described below. FIG. 11 is a diagram illustrating details of a posture feature amount history record n of a registration data set n registered in the database 18. As exemplified in FIG. 11, posture feature amounts n1 to nm are registered in the posture feature amount history record n. A saved date and time, coordinates of characteristic points of a hand, and the like are registered for each of the posture feature amounts.

The posture feature amount classifying unit 16 selects initial representative points (C1, C2, ..., Ck) from among the posture feature amounts n1, n2, ..., nm. For example, the posture feature amount classifying unit 16 may select initial representative points so as to ensure that saved date and times are at equal intervals. Next, the posture feature amount classifying unit 16 calculates distances between the representative points and posture feature amounts other than the representative points and assigns the posture feature amounts to a class of a representative point of which a distance is shortest among the calculated distances. As an example, a distance L between a posture feature amount $Nj=\{(XNj\_1, YNj\_1, ZNj\_1), \ldots, (XNj\_I, YNj\_I, ZNj\_I)\}$ and a representative point $Ci=\{XCj\_1, YCj\_1, ZCj\_1), \ldots, (XCj\_I, YCj\_I, ZCj\_I)\}$ may be expressed by the following Equation (1) or (2).

$$L = \sqrt{\sum_{a=1}^{I} \{(XNj\_a - XCi\_a)^2 + (YNj\_a - YCi\_a)^2 + (ZNj\_a - ZCi\_a)^2\}} \qquad (1)$$

$$L = \sum_{a=1}^{I} \sqrt{\{(XNj\_a - XCi\_a)^2 + (YNj\_a - YCi\_a)^2 + (ZNj\_a - ZCi\_a)^2\}} \qquad (2)$$

The posture feature amount classifying unit 16 calculates an average value of posture feature amounts belonging to each class and treats the average value as a new representative point. An average value Ai of posture feature amounts Ni1, Ni2, Nij of a class I of a representative point Ci may be expressed as illustrated in FIG. 12, and the average value $(XAi\_a, YAi\_a, ZAi\_a)$ may be expressed by the following Equation (3), where $1 \leq a \leq I$.

$$(XAi\_a, YAi\_a, ZAi\_a) = \left( \frac{1}{j}\sum_{b=1}^{j} XNib\_a, \frac{1}{j}\sum_{b=1}^{j} YNib\_a, \frac{1}{j}\sum_{b=1}^{j} ZNib\_a \right) \qquad (3)$$

By using the hierarchical clustering such as the k-means method, posture feature amounts may be reliably classified into a number k of classes set in advance. Thus, storage regions for storing registration data items of each user may be clearly identified and efficiently used. In addition, if the number k of the classes is set to a larger number than the number of types of devices to be used for the inputting, classes, corresponding to postures at the time of the inputting, of posture feature amounts are easily generated.

While there are the aforementioned effects, a class that corresponds to a new posture may not be additionally generated if the number k of classes and the upper limit of the number of classes are fixed and reclassification is repeatedly executed, regardless of the fact that inputting from the new posture other than registration data items is executed.

In order to handle this case, the number k of classes and the upper limit of the number of classes may be changed for reclassification. For example, the posture feature amount classifying unit 16 calculates within-class variance of each class before the reclassification. If there is within-class variance that is equal to or larger than an eighth predetermined value, the posture feature amount classifying unit 16 increases the number k of classes and the upper limit of the number of classes and executes the reclassification. For example, the number of classes of which within-class variance is equal to or larger than the eighth predetermined value may be used as the number k of classes and an increase in the upper limit of the number of classes.

Alternatively, the number k of classes and the upper limit of the number of classes may be changed based on the number of times of the classification executed by the posture feature amount classifying unit as a method that is simpler than the calculation of the within-class variance and applies a low load to a system. For example, the number k of classes and the upper limit of the number of classes may be increased in proportion to the number of times of the classification.

By appropriately increasing the number k of classes and the upper limit of the number of classes, a class that corresponds to a new posture may be generated. In addition, since a registration data item that corresponds to a new posture of a palm is registered, the registration leads to the improvement of the accuracy of the authentication.

It is desirable that the number k of classes and the upper limit of the number of classes be equal to or smaller than the number of registration data items that are able to be registered for a single user.

(Crosschecking Process After Classification)

Figure 13:
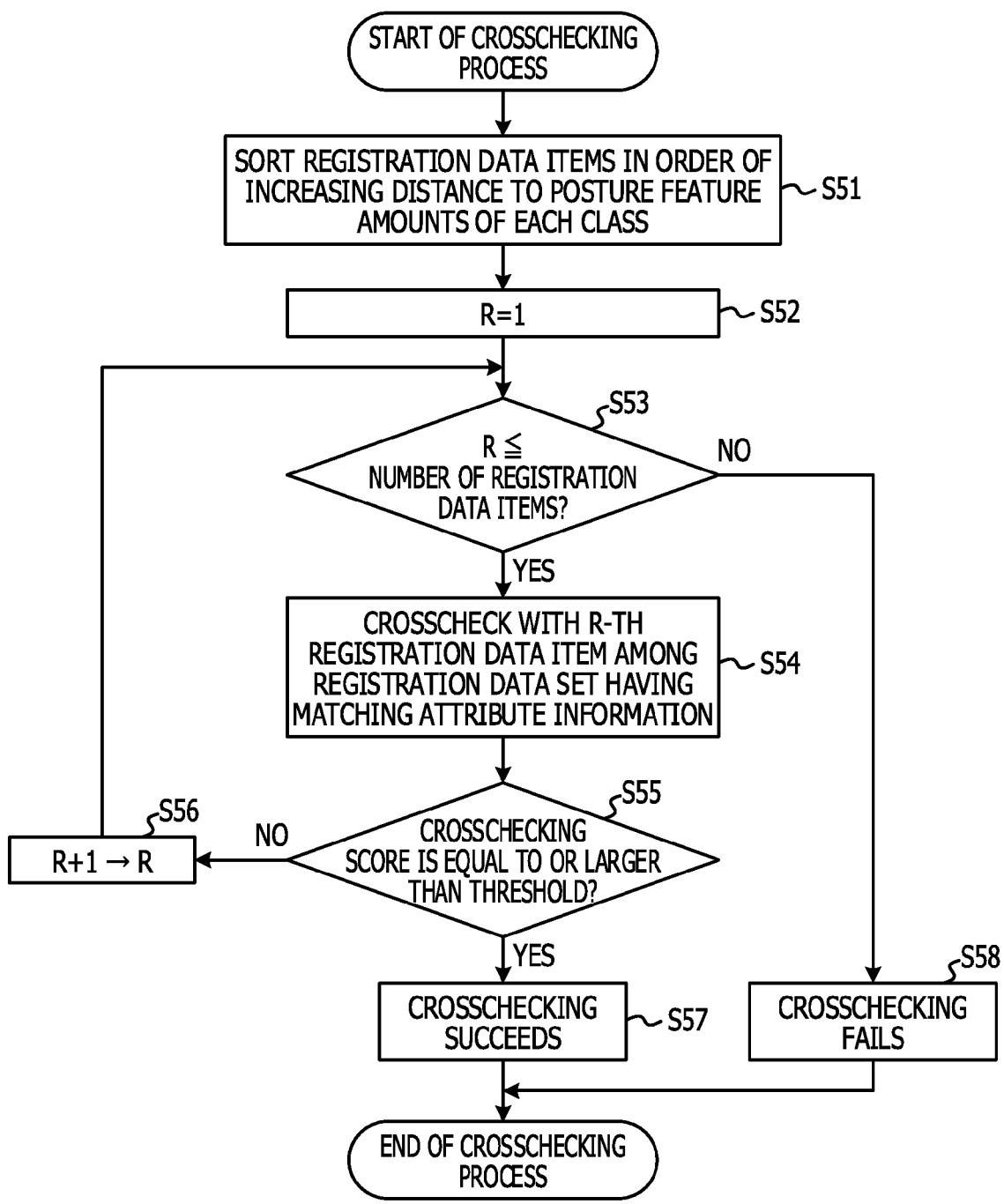
FIG. 13 is a flowchart of an example of a crosschecking process after classification.

FIG. 13 is a flowchart of an example of the crosschecking process after the classification. The crosschecking process after the classification is executed only when posture feature amounts of a target user are already classified in step S13 illustrated in FIG. 7. First, the crosschecking processing unit 14 sorts registration data items in order of increasing distance between posture feature amounts of each class and the posture feature amounts obtained from the image acquired in step S11 and representing the palm (in step S51).

Next, the crosschecking processing unit 14 assigns 1 to the variable R (in step S52). Next, the crosschecking processing unit 14 determines whether or not the variable R is equal to or smaller than the number of the registration data items associated with the attribute information that matches the attribute information acquired in step S11 (in step S53). If the crosschecking processing unit 14 determines that the answer to step S53 is "Yes", the crosschecking processing unit 14 crosschecks the crosschecking data with the R-th registration data item represented by the variable R and is among the registration data items associated with the attribute information that matches the attribute information acquired in step S11 (in step S54).

Next, the crosschecking processing unit 14 determines whether or not a score (similarity) of the crosschecking of the R-th registration data item with the crosschecking data is equal to or larger than the fourth predetermined threshold (in step S55). If the crosschecking processing unit 14 determines that the answer to step S55 is "No", the crosschecking processing unit 14 assigns R+1 to the variable R (in step S56). After that, the process is executed from step S53. If the crosschecking processing unit 14 determines that the answer to step S55 is "Yes", the crosschecking processing unit 14 determines that the crosschecking succeeds (in step S56). Then, the execution of the process represented by the flowchart is terminated. If the crosschecking processing unit 14 determines that the answer to step S53 is "No", the crosschecking processing unit 14 determines that the crosschecking fails (in step S58). Then, the execution of the process represented by the flowchart is terminated.

(Additional Registration and Update Registration Function of Registration Data Update Determining Unit)

Figure 14:
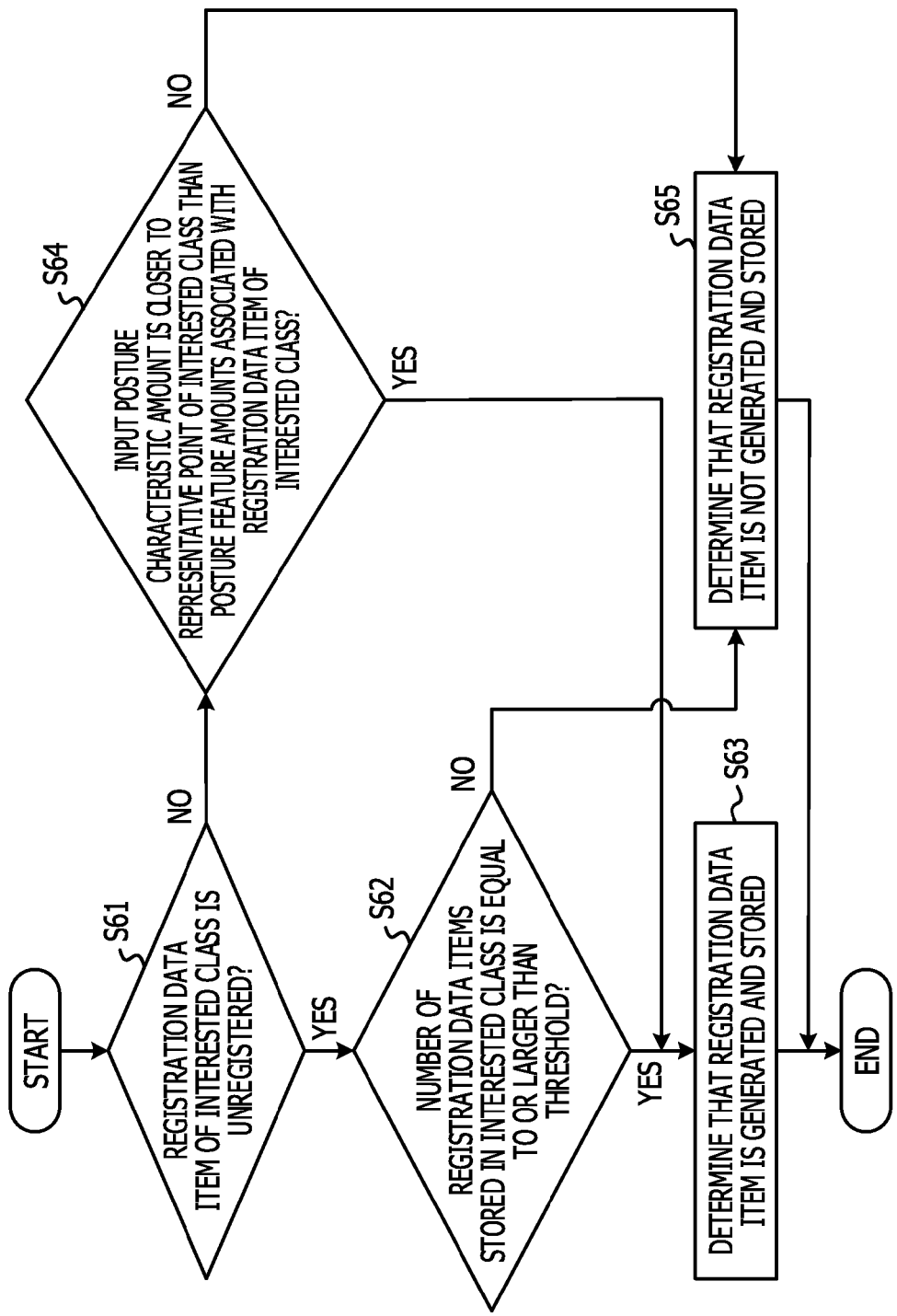
FIG. 14 is a flowchart of an example of determination of additional registration.

The registration data update determining unit 17 may execute a determination process represented by a flowchart illustrated in FIG. 14. As exemplified in FIG. 14, the registration data update determining unit 17 determines whether or not a registration data item of an interested class is unregistered (in step S61). If the registration data update determining unit 17 determines that the answer to step S61 is "Yes", the registration data update determining unit 17 determines whether or not the number of posture feature amounts stored in the interested class is equal to or larger than the second predetermined number (in step S62). If the registration data update determining unit 17 determines that the answer to step S62 is "Yes", the registration data update determining unit 17 determines that a registration data item is generated and stored (in step S63). If the registration data update determining unit 17 determines that the answer to step S61 is "No", the registration data update determining unit 17 determines whether or not an input posture feature amount is closer to a representative point of the class than posture feature amounts associated with the registration data item of the interested class (in step S64). If the registration data update determining unit 17 determines that the answer to step S64 is "Yes", step S63 is executed. If the registration data update determining unit 17 determines that the answer to step S62 or S64 is "No", the registration data update determining unit 17 determines that the registration data item is not generated and stored (in step S65).

If the crosschecking newly executed by the crosschecking processing unit 14 succeeds, and a distance between a representative point of a class to which a posture feature amount belongs and the posture feature amount is smaller than distances between posture feature amounts already registered in the interested class and the representative point, the registration data update determining unit 17 determines that the crosschecking data is able to be additionally registered as a registration data item. Alternatively, the registration data generator 11 may discard existing registration data items already registered in the interested class and update and register the crosschecking data input instead.

By adding the process of adding a registration data item or the update process, a registration data item that is close to a representative point of a class may be registered. The closer the registration data item associated with a posture feature amount to the representative of the class, the larger the number of postures covered by the class and supported. Thus, differences between postures of registration data items and postures of authentication data are small, a time for the crosschecking process may be reduced, and the accuracy of the authentication may be improved.

According to the present embodiment, if the crosschecking of biometric information acquired from a living body of a user with registration biometric information of the user succeeds, posture feature amounts are extracted from the biometric information, associated with the biometric information, and registered as new registration biometric information of the user. Since biometric information that is successfully crosschecked is registered, registration data items that are unconsciously input by a user and correspond to a posture may be registered. Thus, biometric information that is used to improve the accuracy of the authentication may be extracted.

In addition, since the posture feature amount classifying unit 16 automatically classifies posture feature amounts, the registration process and the crosschecking process may be efficiently achieved by automatically additionally registering registration data items associated with each class. In addition, if a registration data item that is more suitable as a representative of a class than already registered registration data items is generated, the registration data item is updated or additionally registered so as to be used for the authentication, and thus the accuracy of the authentication may be improved.

Even if there are a plurality of types of postures at the time of the inputting, an increase, caused by a reduction in a time for positioning, in a time for the authentication may be suppressed by using, for the authentication, registration data items associated with a class of each of the postures. In addition, even if a certain posture significantly changes from a normal posture, it is highly likely that a registration data item of a class that is close to the certain posture exists, authentication of an interested person hardly fails, and an increase in a rate of rejecting the person may be inhibited.

In addition, if the registration data update determining unit does not determine that a registration data item is updated, a registration data item is not added, and thus only a minimal number of registration data items may be stored. Thus, the number of storage regions of the system may be reduced and the cost may be suppressed. Furthermore, the difficulty of analysis by a hill climb attack or the like increases and a security risk caused by leakage of data is reduced.

In addition, the classification according to the present embodiment does not depend on the ID of a device. Thus, even if postures at the time of the inputting are significantly different due to the use of different methods for using the same device, appropriate classification is possible. By setting the number of registration data items to be registered in an initial registration operation to 1, a load of a user may be reduced and the usability may be increased. However, a plurality of registration data items may be used in the initial registration operation.

In addition, in the crosschecking process after the classification, a time for the crosschecking may be reduced by terminating the crosschecking process if the crosschecking with any of registration data items succeeds. Although the registration data items are sorted in order of increasing distance between posture feature amounts of each class and the posture feature amounts obtained from the image of the palm in the process represented by the flowchart illustrated in FIG. 13, the process is not limited to this. For example, only a registration data item associated with a posture feature amount of which a distance is shortest among distances between the posture feature amounts acquired from the image of the palm and postural the characteristic amounts of each class may be crosschecked.

In addition, an order in which registration data items are used for the crosschecking may be an order in which the registration data items are newly additionally registered or a reverse chronological order of dates when the last authentication is executed, for example. If a user is proficient at inputting of biometric information, a frequency at which the inputting is executed with the same posture as the latest inputting is high, and a probability that registration data items are selected based on the latest input state and crosschecked in order from a registration data item close to input authentication data is high. In addition, the authentication process may be completed for a shorter time.

Figure 15A:
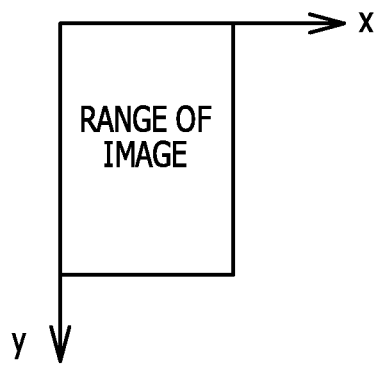
FIGS. 15A and 15B are diagrams illustrating a two-dimensional fingerprint image.
Figure 15B:
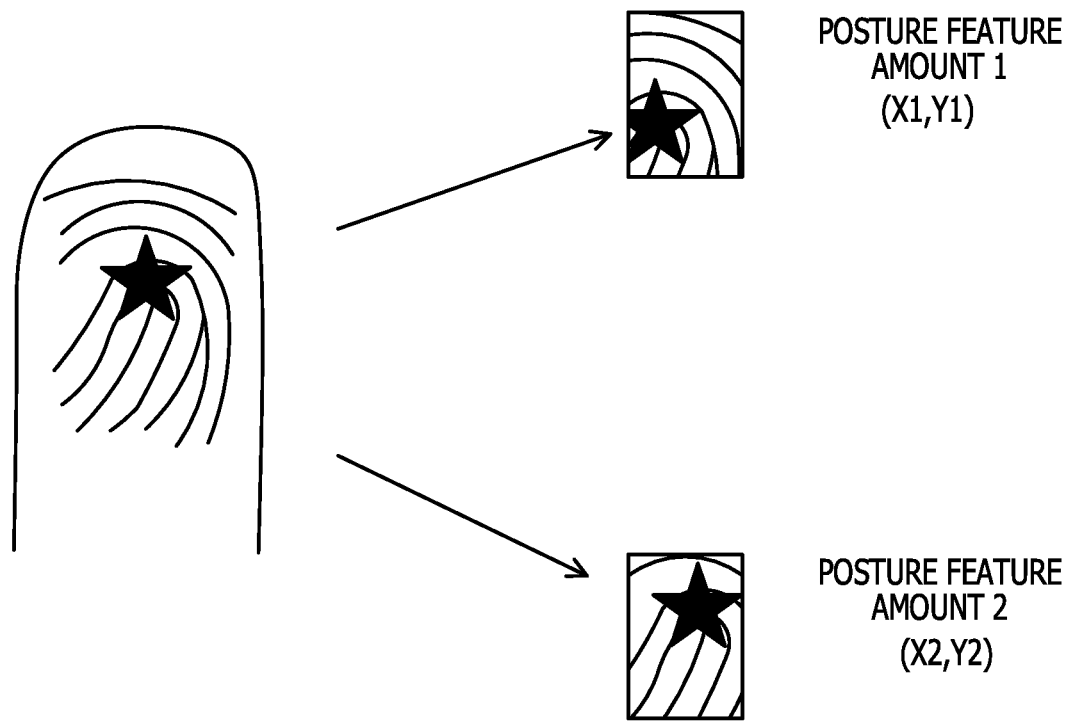

Although the venous pattern is used as the biometric information of the palm in the aforementioned example, other biometric information of the palm, such as a palm print or the shape of the palm, may be used. In addition, posture feature amounts may be extracted from a two-dimensional image of fingerprints or a three-dimensional image of the fingerprints. In this case, orthogonal coordinates with its origin at the top left of the two-dimensional image of the fingerprints may be used as an example, as illustrated in FIG. 15A. As illustrated in FIG. 15B, positional coordinates of the centers of the fingerprints may be used as posture feature amounts. Positional coordinates of the center of a fingerprint may be coordinates (X1, Y1) or (X2, Y2) based on a posture of the finger. A three-dimensional image of the fingerprints may be used. In this case, as an example, three-dimensional coordinates using the sensor as a standard may be used, like an image of a palmar vein image. As posture feature amounts in this case, three-dimensional positional coordinates of the centers of the fingers may be used. By extracting posture feature amounts from an image of the fingerprints in the aforementioned manner, the present embodiment is applicable to fingerprint authentication.

In addition, in the aforementioned example, the crosschecking is executed after the user is identified based on the attribute information. However, crosschecking data may be crosschecked with an unspecified number of registration data items without the acquisition of attribute information. In this case, posture feature amounts of the unspecified number of users may be classified without classification of posture feature amounts for each of the users.

In the first embodiment, the biometric sensor 105 functions as a biometric information acquirer configured to acquire biometric information for the crosschecking from a living body of a user. In addition, the crosschecking processing unit 14 functions as a crosschecking unit configured to crosscheck biometric information registered in advance with the biometric information for the crosschecking. In addition, the registration data generator 11 functions as a registering unit configured to associate the biometric information for the crosschecking with posture feature amounts of the living body and register the biometric information for the crosschecking as additional registration biometric information if the crosschecking executed by the crosschecking unit succeeds. Furthermore, the posture feature amount classifying unit 16 functions as a classifying unit configured to classify a plurality of posture feature amounts registered by the registering unit into one or more classes.

Second Embodiment

Figure 16:
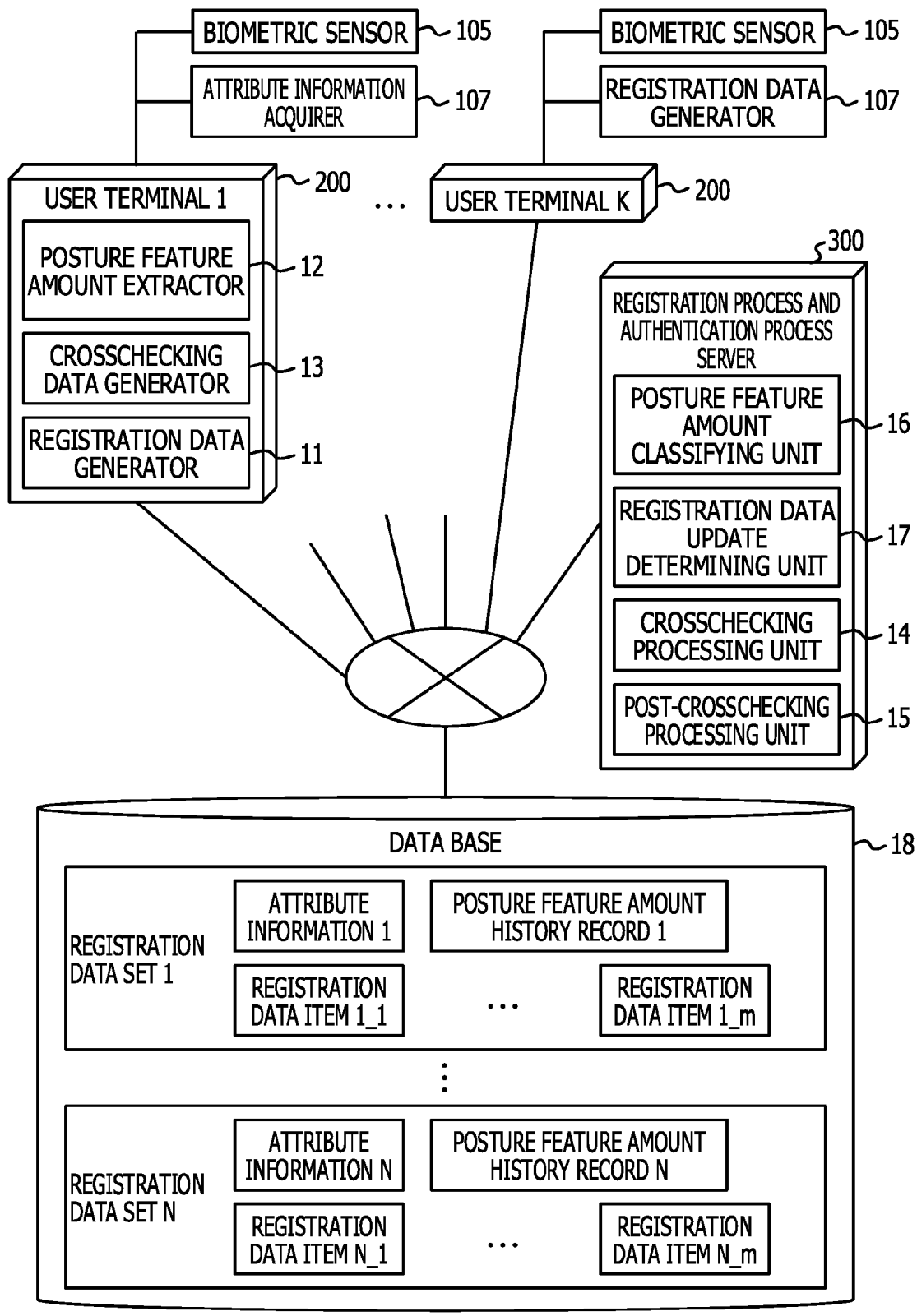
FIG. 16 illustrates an example in which the biometric information extracting device is achieved by a system including a plurality of terminals and a server.

Although the first embodiment describes the example in which the functions are included in the single biometric information extracting device, the functions are not limited to this. For example, the functions described in the first embodiment may be distributed to a terminal, a server, and the like. FIG. 16 illustrates an example in which the biometric information extracting device 100 according to the first embodiment is achieved by a system including a plurality of terminals and a server. The registration data generator 11, the posture feature amount extractor 12, and the crosschecking data generator 13 may be achieved in user terminals 200 that each include the biometric sensor 105 and the attribute information acquirer 107. The crosschecking processing unit 14, the post-crosschecking processing unit 15, the posture feature amount classifying unit 16, and the registration data update determining unit 17 may be achieved in the registration process and authentication process server 300 that includes the database 18.

Figure 17:
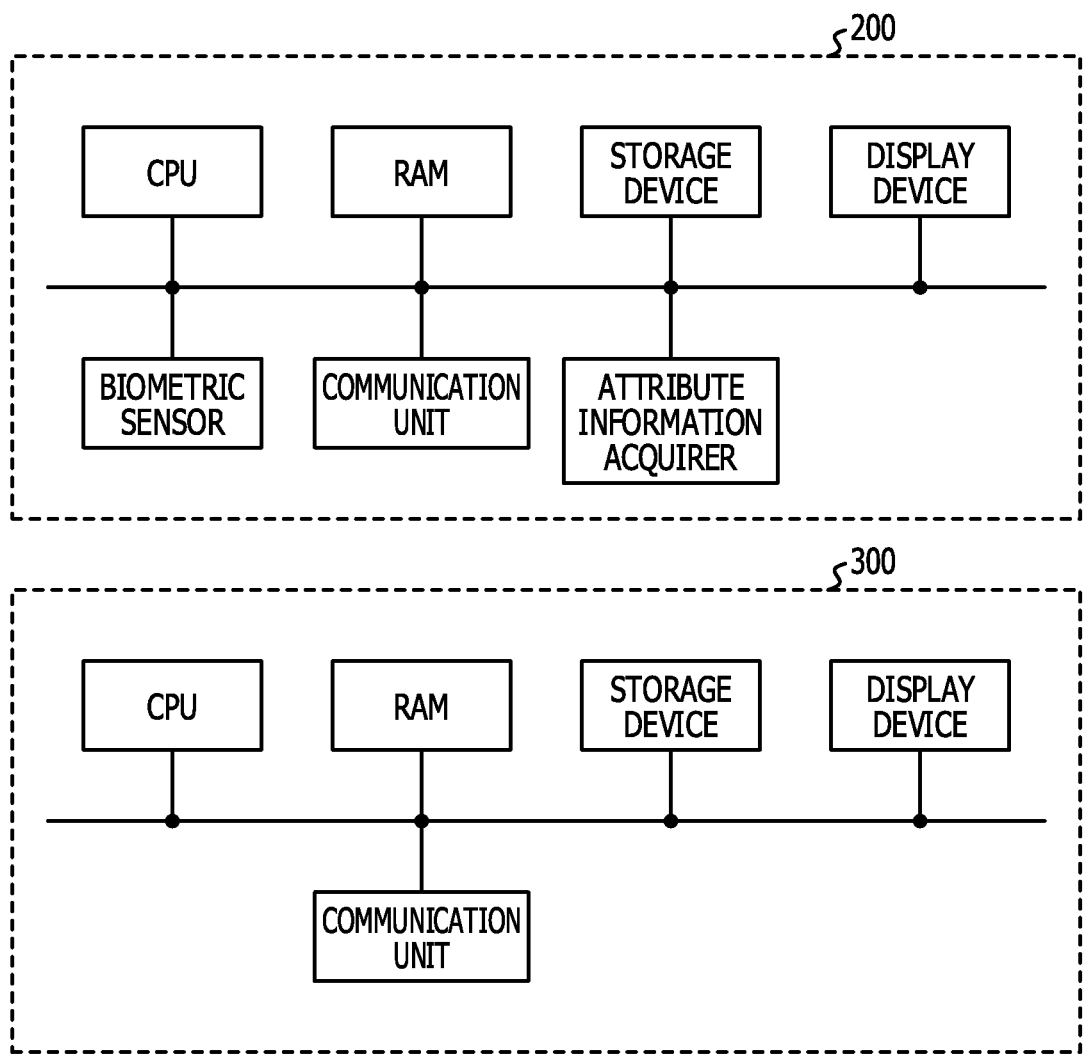
FIG. 17 is a diagram illustrating a hardware configuration of the system.

FIG. 17 is a diagram illustrating a hardware configuration of the system illustrated in FIG. 16. Referring to FIG. 17, the user terminals 200 each include a CPU, a RAM, a storage device, a display device, a biometric sensor, a communication unit, and an attribute information acquirer. The registration process and authentication process server 300 includes a CPU, a RAM, a storage device, a display device, and a communication unit. The biometric information extraction program is stored in one or more of the devices and executed by each of the devices.

Although the embodiments of the disclosure are described above in detail, the disclosure is not limited to the specific embodiments and may be variously modified and changed within the scope of the disclosure described in claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric information registration device comprising:
   a memory; and
   at least one processor coupled to the memory, the at least one processor being configured to:
   collect a plurality of biometric information extracted from each of a plurality of images of a member and a plurality of positions of the member to a capture device when each of the plurality of images is captured by the capture device,
   classify, for each specified position of the member among the plurality of positions of the member corresponding to each of the plurality of images, the specified position of the member into one of a plurality of classes, each of the plurality of classes being associated with a respective representative position included in a plurality of representative positions, the specified position of the member being classified into a specified class, among the plurality of classes, associated with a specified representative position that is closest to the specified position included in the plurality of representative positions,
   count a number of positions that is classified into each of the plurality of classes, and
   register biometric information in the memory, from among the plurality of biometric information, associated with a certain class for which the number of counted positions match a predetermined condition,
   wherein each of the plurality of biometric information have succeeded in verification with pre-registered biometric information before the classifying, and
   wherein both the pre-registered biometric information and the registered biometric information are registered, in the memory, for the verification after the registering.

2. The biometric information registration device according to claim 1, wherein
   the at least one processor is configured to extract a feature amount indicating the position of the member in each of the plurality of images, and
   the position is classified based on the feature amount into one of the plurality of classes.

3. The biometric information registration device according to claim 2, wherein the feature amount is classified based on hierarchical clustering regarding a plurality of feature amounts extracted from the plurality of images.

4. The biometric information registration device according to claim 2, wherein the feature amount is classified based on non-hierarchical clustering regarding a plurality of feature amounts extracted from the plurality of images.

5. The biometric information registration device according to claim 2, wherein the at least one processor is configured to:
   determine a representative point of a part of a plurality of feature amounts, the part of the plurality of feature amounts being classified in the certain class,
   calculate distances between each of the part of the plurality of feature amounts and the representative point, and
   identify the biometric information to be registered based on the distances.

6. The biometric information registration device according to claim 5, wherein the biometric information that corresponds to a certain feature amount having minimum distance is registered.

7. The biometric information registration device according to claim 2, wherein the at least one processor is configured to:
   store the feature amount of each of the plurality of the images, and
   receive a new image,
   extract new biometric information and new feature amount from the new image, and
   register the new biometric information, when verification of the new biometric information succeeds and the number of times a class in which the new feature amount is classified match the predetermined condition.

8. The biometric information registration device according to claim 1, wherein the position is based on at least one of an angle of the member with respect to a sensor that captures the plurality of images and a distance between the member and the sensor.

9. The biometric information registration device according to claim 1, wherein the member is a hand, and the biometric information is vein pattern data.

10. A non-transitory storage medium storing a biometric information registration program, which when executed by a computer, causes the computer to:
    collect a plurality of biometric information extracted from each of a plurality of images of a member and a plurality of positions of the member to a capture device when each of the plurality of images is captured by the capture device;

classify, for each specified position of the member among the plurality of positions of the member corresponding to each of the plurality of images, the specified position of the member into one of a plurality of classes, each of the plurality of classes being associated with a respective representative position included in a plurality of representative positions, the specified position of the member being classified into a specified class, among the plurality of classes, associated with a specified representative position that is closest to the specified position included in the plurality of representative positions;

count a number of positions that is classified into each of the plurality of classes; and register biometric information, from among the plurality of biometric information, associated with a certain class for which the number of counted positions match a predetermined condition, wherein each of the plurality of biometric information have succeeded in verification with pre-registered biometric information before the classifying, and wherein both the pre-registered biometric information and the registered biometric information are registered, in a memory, for the verification after the registering.

11. A biometric information registration method comprising:

collecting a plurality of biometric information extracted from each of a plurality of images of a member and a plurality of positions of the member to a capture device when each of the plurality of images is captured by the capture device;

classifying, for each specified position of the member among the plurality of positions of the member corresponding to each of the plurality of images, the specified position of the member into one of a plurality of classes, each of the plurality of classes being associated with a respective representative position included in a plurality of representative positions, the specified position of the member being classified into a specified class, among the plurality of classes, associated with a specified representative position that is closest to the specified position included in the plurality of representative positions;

counting, by at least one processor, a number of positions that is classified into each of the plurality of classes; and registering biometric information, from among the plurality of biometric information, associated with a certain class for which the number of positions match a predetermined condition, wherein each of the plurality of biometric information have succeeded in verification with pre-registered biometric information before the classifying, and wherein both the pre-registered biometric information and the registered biometric information are registered, in a memory, for the verification after the registering.

12. The biometric information registration method according to claim 11, the biometric information registration method further comprising:

extracting a feature amount indicating the position of the member in each of the plurality of images, and wherein the position is classified based on the feature amount into one of the plurality of classes.

13. The biometric information registration method according to claim 12, wherein the feature amount is classified based on hierarchical clustering regarding a plurality of feature amounts extracted from the plurality of images.

14. The biometric information registration method according to claim 12, wherein the feature amount is classified based on non-hierarchical clustering regarding a plurality of feature amounts extracted from the plurality of images.

15. The biometric information registration method according to claim 12, the biometric information registration method further comprising:

determining a representative point of a part of a plurality of feature amounts, the part of the plurality of feature amounts being classified in the certain class;

calculating distances between each of the part of the plurality of feature amounts and the representative point; and identifying the biometric information to be registered based on the distances.

16. The biometric information registration method according to claim 15, wherein the biometric information that corresponds to a certain feature amount having minimum distance is registered.

17. The biometric information registration method according to claim 12, the biometric information registration method further comprising:

storing the feature amount of each of the plurality of the images; and receiving a new image;

extracting new biometric information and new feature amount from the new image; and registering the new biometric information, when verification of the new biometric information succeeds and the number of times a class in which the new feature amount is classified match the predetermined condition.

18. The biometric information registration method according to claim 11, wherein the position is based on at least one of an angle of the member with respect to a sensor that captures the plurality of images and a distance between the member and the sensor.

* * * * *